US012537035B1

(12) United States Patent
Bala et al.

(10) Patent No.: US 12,537,035 B1
(45) Date of Patent: Jan. 27, 2026

(54) SYSTEM AND METHOD FOR STROBE-BASED READ PATH CLOCKING

(71) Applicant: Cadence Design Systems, Inc., San Jose, CA (US)

(72) Inventors: Phalguni Bala, Karanataka (IN); Gaurav Pradeep Bhojane, Maharashtra (IN); Hajee Mohammed Shuaeb Fazeel, Bengaluru (IN)

(73) Assignee: Cadence Design Systems, Inc., San Jose, CA (US)

( * ) Notice: Subject to any disclaimer, the term of this patent is extended or adjusted under 35 U.S.C. 154(b) by 122 days.

(21) Appl. No.: 18/488,184

(22) Filed: Oct. 17, 2023

(51) Int. Cl.
*G11C 7/22* (2006.01)
*G11C 7/10* (2006.01)

(52) U.S. Cl.
CPC .......... *G11C 7/222* (2013.01); *G11C 7/1039* (2013.01); *G11C 7/1066* (2013.01)

(58) Field of Classification Search
CPC ...................................................... G11C 7/222
See application file for complete search history.

(56) References Cited

U.S. PATENT DOCUMENTS

| 11,909,404 B1 * | 2/2024 | Chu ........................ H03L 7/189 |
| 2022/0199132 A1 * | 6/2022 | Partsch .................. G11C 7/222 |

* cited by examiner

*Primary Examiner* — Hoai V Ho
(74) *Attorney, Agent, or Firm* — Mark H. Whittenberger; Holland & Knight LLP

(57) ABSTRACT

Embodiments included herein are directed towards burst strobe read path clocking circuits and methods of using the same. Embodiments may include strobe-based clocking circuitry configured to receive an output from phase locked loop circuitry and an output from a memory controller. Embodiments may further include clock tree circuitry configured to receive an output from strobe-based clocking circuitry and provide feedback to the strobe-based clocking circuitry. Embodiments may also include slice circuitry configured to receive an output from the clock tree circuitry, wherein a plurality of modes of operation are simultaneously enabled.

18 Claims, 8 Drawing Sheets

SYSTEM AND METHOD FOR STROBE-BASED READ PATH CLOCKING

BACKGROUND

Synchronous dynamic random-access memory (synchronous dynamic RAM or SDRAM) is any DRAM where the operation of its external pin interface is coordinated by an externally supplied clock signal. Graphics double data rate 7 synchronous dynamic random-access memory (GDDR7 SDRAM) is a type of synchronous graphics random-access memory (SGRAM) specified by the Joint Electron Device Engineering Council (JEDEC) Semiconductor Memory Standard, with a high bandwidth, double data rate interface. It is designed for use in graphics cards, game consoles, and high-performance computing. It is a type of GDDR SDRAM and is the successor to GDDR6.

SUMMARY

In one or more embodiments of the present disclosure, a burst strobe read path clocking circuit is provided. The circuit may include strobe-based clocking circuitry configured to receive an output from phase locked loop circuitry and an output from a memory controller. The circuit may further include clock tree circuitry configured to receive an output from strobe-based clocking circuitry and to provide feedback to the strobe-based clocking circuitry. The circuit may also include slice circuitry configured to receive an output from the clock tree circuitry, wherein a plurality of modes of operation are simultaneously enabled.

One or more of the following features may be included. In some embodiments, the burst strobe read path clocking circuit may be configured to operate with a graphics double data rate 7 synchronous dynamic random-access memory GDDR7 standard. All modes may be simultaneously enabled using a strobe as a read path clock. The circuit may further include a first and second phase interpolator included within the strobe-based clocking circuitry. The first phase interpolator may receive the feedback from the strobe-based clocking circuitry. The second phase interpolator may be configured to align an output clock signal with the signal using a phase detector and a phase aligner. The circuit may include a glitch free clock multiplexer configured to dynamically switch its output based upon, at least in part, a digital logic signal. During a burst mode no re-training of the read path may occur. The clock tree circuitry may be configured to run at a full rate if a burst occurs. The slice circuitry may be configured to receive the output from the phase locked loop circuitry.

In another embodiment of the present disclosure a burst strobe read path clocking method is provided. The method may include receiving, at RCK strobe-based clocking circuitry, an output from phase locked loop circuitry and an output from a memory controller. The method may further include receiving, at RCK clock tree circuitry, an output from RCK strobe-based clocking circuitry and providing feedback from the RCK clock tree circuitry to the RCK strobe-based clocking circuitry. The method may also include receiving, at slice circuitry, an output from the RCK clock tree circuitry, wherein a plurality of RCK modes are simultaneously enabled.

One or more of the following features may be included. In some embodiments, the burst strobe read path clocking circuit may be configured to operate with a graphics double data rate 7 synchronous dynamic random-access memory GDDR7 standard. All RCK modes may be simultaneously enabled using an RCK strobe as a read path clock. The method may also include providing a first and second phase interpolator within the RCK strobe-based clocking circuitry. The first phase interpolator may receive the feedback from the RCK strobe-based clocking circuitry. The second phase interpolator may be configured to align an output clock signal with the RCK signal using a phase detector and a phase aligner. The method may further include dynamically switching an output of a glitch free clock multiplexer based upon, at least in part, a digital logic signal. During an RCK burst mode no re-training of the read path may occur. The RCK clock tree circuitry may be configured to run at a full rate if an RCK burst occurs. The method may further include receiving the output from the phase locked loop circuitry at WCK slice circuitry.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
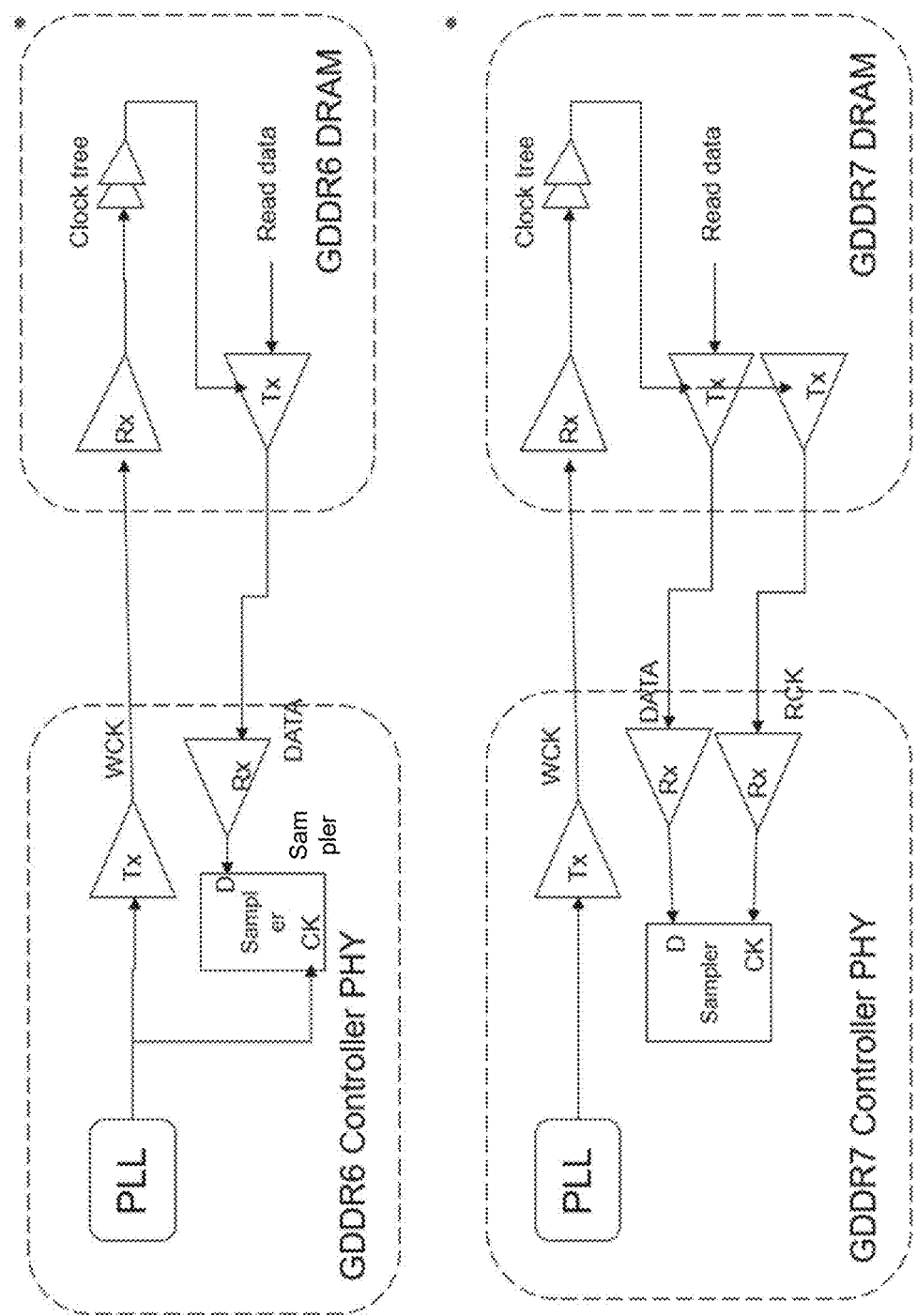
FIG. 1 is an example block diagram showing read path clocking examples of GDDR6 vs GDDR7.

Referring now to FIG. 1, an example block diagram 100 showing read path clocking examples of GDDR6 vs GDDR7. More specifically, FIG. 1 shows data transmission between a GDDR6 controller PHY and a GDDR6 DRAM and a GDDR7 controller PHY and a GDDR7 DRAM. WCK is the clock output from GDDR6/GDDR7 controller PHY to GDDR6/GDDR7 DRAM. The DRAM uses this WCK clock and generates the clock to sample incoming data from the controller and also output data from DRAM to controller.

RCK is the strobe clock output from GDDR7 DRAM and may be generated from WCK clock input to the DRAM. The read data transmitted from GDDR7 DRAM to the GDDR7 controller PHY is synchronous with this RCK clock output. RCK can be continuous or burst in nature.

In GDDR6, the read path sampler may obtain a clock from the PLL and read data may be launched by the WCK after the clock tree in DRAM. These two paths may be unmatched by a time period. Read data will accumulate power supply induced jitter and random jitter in the controller PHY and DRAM with respect to the sampling clock. In GDDR7, the read data and the RCK are synchronous as they are launched from same WCK edge. In some cases, there may be no relative jitter accumulation between RCK and read data at the data samplers. For example, this may be true at the input of the controller PHY. However, the RCK distribution tree may cause a mismatch between the data and clock inputs of the sampler. This delay mismatch may be far less than when the PLL clock is used to sample the data.

In GDDR7, a separate differential RCK strobe is introduced to mitigate the longer jitter accumulation time issue present in the GDDR6 protocol. In GDDR6, during a read operation a local PLL clock is used to sample the read data coming from DRAM. The read data is launched from DRAM using a WCK clock sent from the controller PHY itself using same PLL clock. Though the read sampling clock and WCK/data are effectively driven by the same PLL but WCK and hence the read data suffers longer latency as the WCK clock tree in DRAM has a maximum latency. This may cause the read data to accumulate jitter with respect to the local clock. This longer jitter accumulation time has an adverse effect on the maximum read data transfer that can be achieved for a given bit error rate (BER).

Accordingly, embodiments of the present disclosure may mitigate this issue by introducing a differential strobe RCK for the read path. As such, both the data and RCK may be launched using the same WCK synchronously. The relative jitter between the data and RCK gets cancelled. Therefore, RCK strobe-based read path clocking may help to achieve a higher data rate for a given BER than a local PLL clock-based clocking scheme. The RCK may have burst mode, always on mode, and disable mode.

Figure 2:
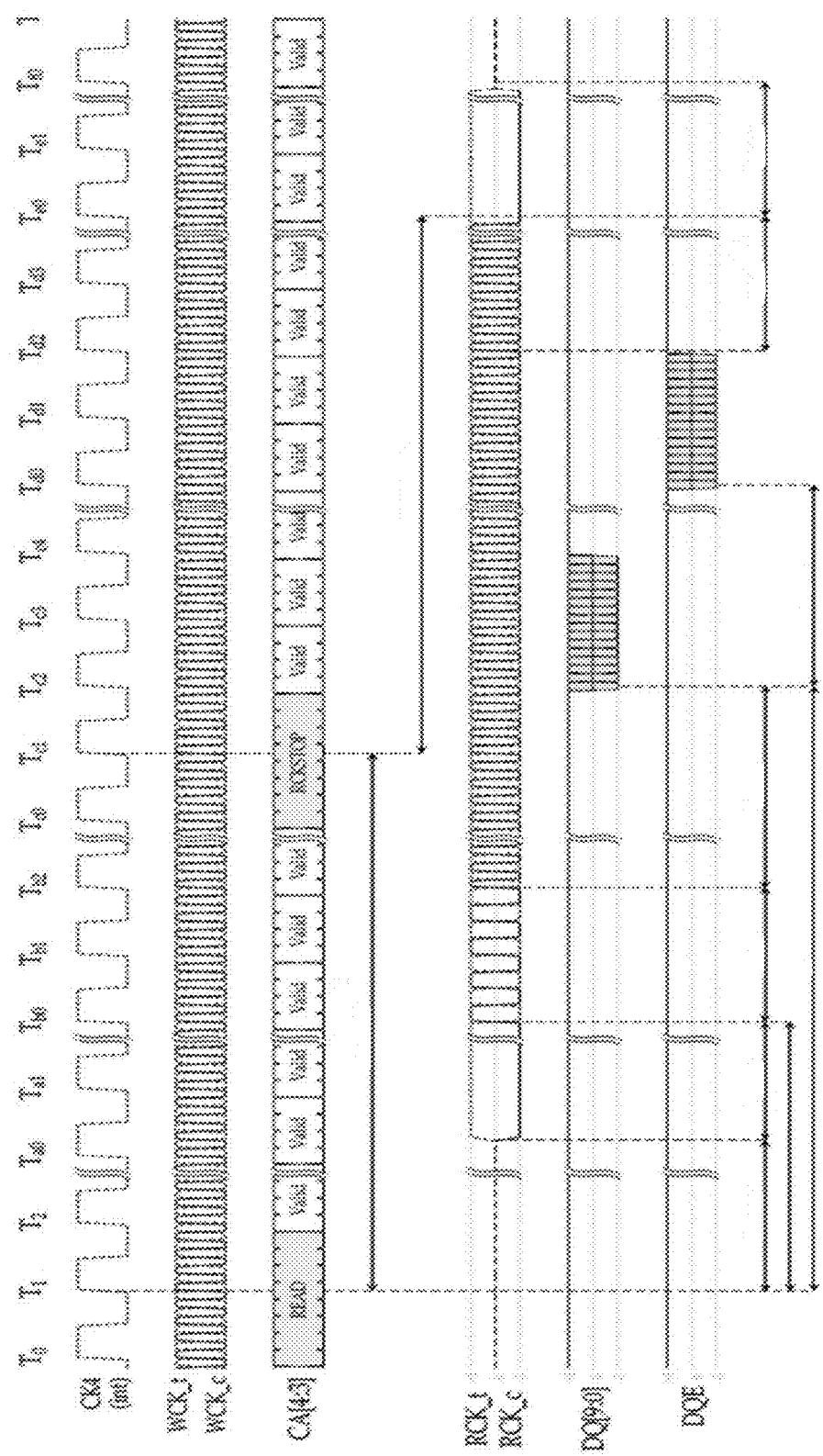
FIG. 2 is a timing diagram of a read operation with burst RCK in GDDR7.

As discussed above, in GDDR7, RCK may have burst, always on or disable mode. Referring now to FIG. 2, a timing diagram 200 of a read operation with burst RCK in GDDR7 is provided. During high-speed operation of GDDR7, typically a current mode logic (CML) clock tree may be used to take advantage of its lower power noise sensitivity. If the CML clock tree is parked in one logic state, ageing of the input stages of the CML tree may be uneven leading to offset accumulation in the tree which may cause duty cycle distortion at the clock output. There are solutions to prevent offset to accumulate by putting AC coupling in the clock tree, which requires a significant settling time to produce a stable clock. At samplers and subsequent stages, a CMOS clock may be used. An AC coupled CML2CMOS level shifter may be used for its superior performance at higher frequency. It may require some settling time before it produces a stable clock. In very high-speed applications like GDDR6/7 a phase interpolator (PI) is the main delay adjustor in the DQ read clock path for its superior performance. Again, the phase interpolator may also need a stable frequency input clock to produce correct clock phases at the output.

Therefore, for the entire clock path to maintain its operating state a stable clock is always needed. If the clock is stopped at any time, the clock path may need some settling time to produce a stable clock. During this settling time some of the clock cycle may be missed. Again, the read data path may be trained in the initialization phase using the memory controller. Synchronicity of the read path should be maintained. The synchronicity depends on read latency, FIFO read/write pointer relations, etc. The timing diagram of the RCK burst mode (FIG. 2) illustrates different RCK states to reach a full rate read strobe clock before actual read data arrives at the pad. If any of the RCK edges are missed while achieving a full rate, timing may be affected. Re-training of the read path may require a long iterative process.

In some embodiments, for quick RCK burst-to-burst turnaround time it is important that none of the RCK edges are missed and that the DRAM read path is always synchronized with the memory controller after initialization. If there is a long gap between two bursts, any VT drift of the clock tree may be unknown. It is important that during no RCK period, there should be a scheme to keep track of VT drift of this clock tree. Embodiments included herein may use an RCK strobe as a sampling clock to take advantage of lesser jitter accumulation. The CML clock tree and phase interpolator should always toggle at the full rate clock to ensure a quick burst-to-burst turnaround and to maintain synchronicity of the read path after initialization. Again, a scheme of continuous VT tracking of the clock tree even in non RCK period will improve the BER further.

Figure 3:
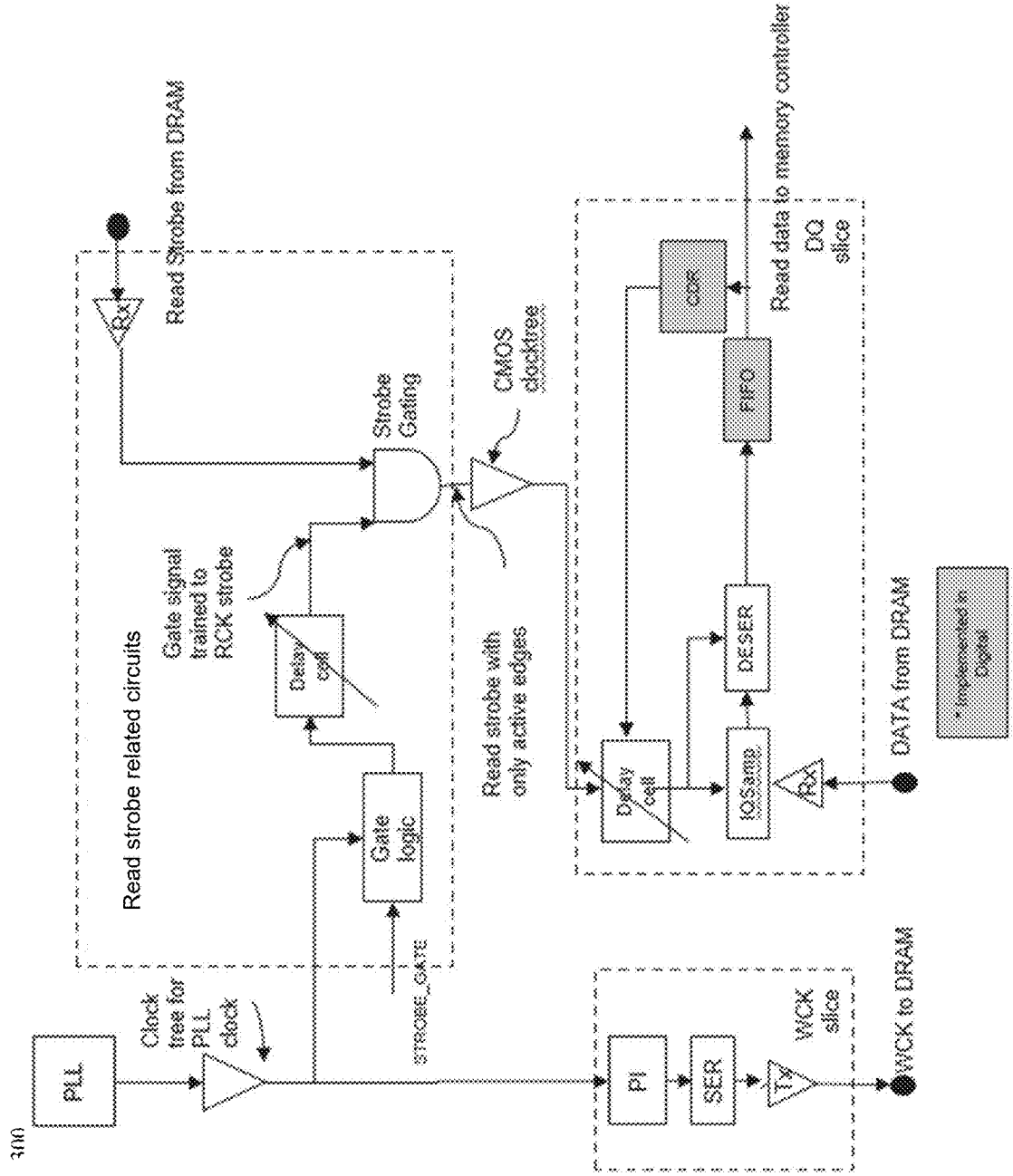
FIG. 3 is an existing approach for burst strobe based read path clocking.

Referring now to FIG. 3, a diagram 300 showing an existing approach for burst strobe based read path clocking is provided. Some burst strobe-based read path clocking solutions may include, for example, DDR4/5 HBM2/3, where a separate gate training is performed in the beginning so that only required strobe edges are passed. These solutions may work for lower data rates, where a CMOS clock tree is used along with delay cell-based phase adjustment as the CMOS clock tree and delay cells works with burst read strobe. For GDDR6/7 like applications where the CML clock tree, phase interpolators and AC coupled stages are used, the correct clock cannot be produced with only filtered active edges.

Figure 4:
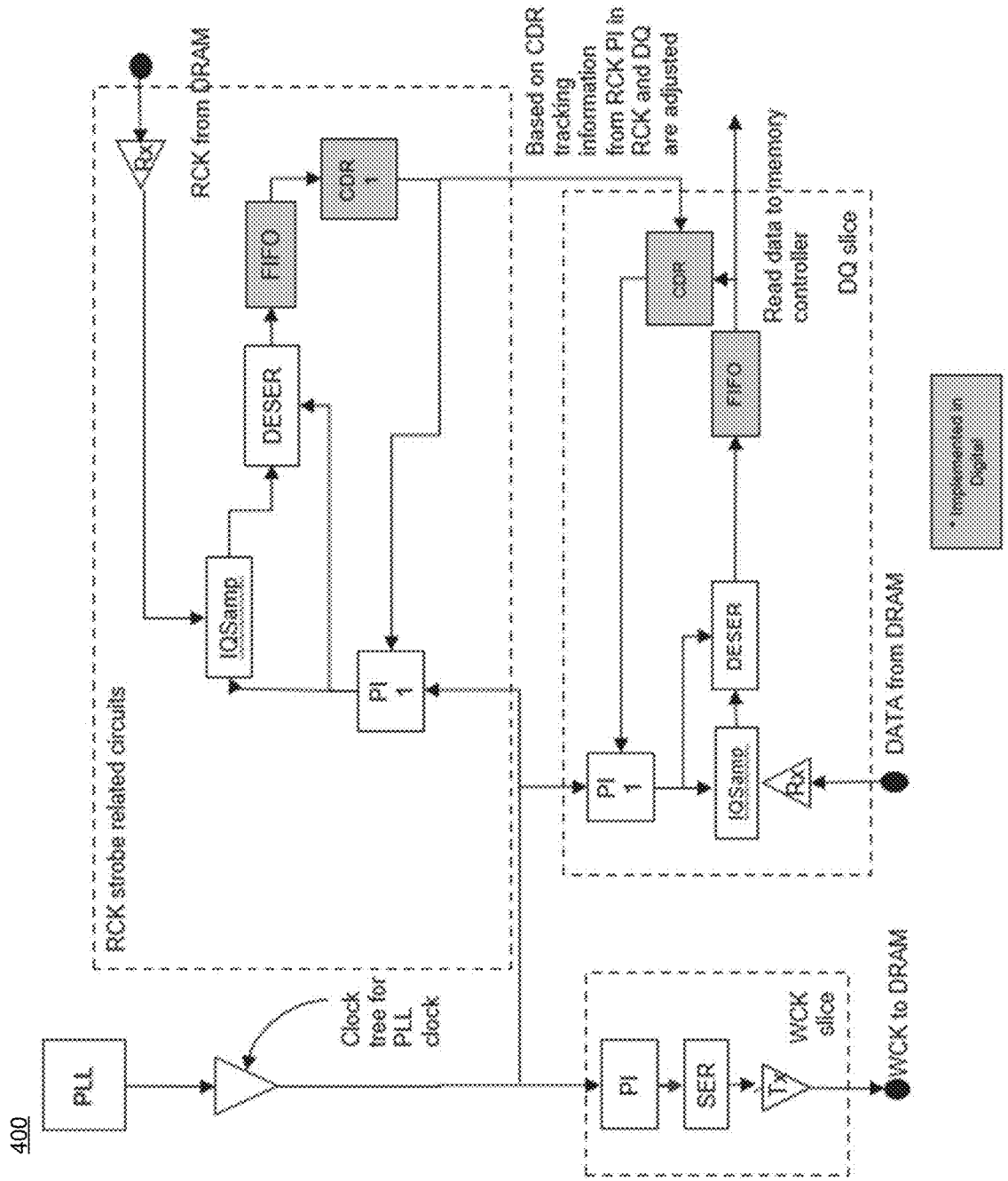
FIG. 4 is an existing approach for phase locked loop clock based read path clocking.

Referring now to FIG. 4, a diagram 400 showing an existing approach for phase locked loop clock based read path clocking is provided. This example shows a PLL clock based read path clocking, where received DQ and RCK are launched from DRAM using a delayed WCK sent from the same PLL clock. In this example, read data and RCK may accumulate jitter, greatly reducing the timing margin at the DRAM-PHY interface. RCK is used only for VT drift tracking and information is passed to the clock and data recovery in the data (DQ) slice. The phase interpolators (PI1) in the receive path of RCK and DQ slices may be adjusted to track the drift. If RCK is stopped for a long period of time, there is no tracking information. The read strobe position may drift from an optimal position thereby reducing the timing margin.

Referring now to FIGS. 5-8, embodiments depicting an RCK strobe-based read path clocking approach are provided. As discussed below, embodiments may include a full rate clock to CML tree and a phase interpolator to maintain synchronicity. Embodiments may include fast burst-to-burst turnaround and continuous VT tracking.

Referring again to FIG. 5, a block diagram 500 of RCK strobe-based read path clocking consistent with embodiments of the present disclosure is provided. Diagram 500 includes PLL circuitry 502, RCK strobe related circuitry 504, DQ slice circuitry 506, and WCK slice circuitry 508. In this particular example, Rx to IQ samplers and clock path to IQ samplers in DQ slice circuitry 506 and RCK strobe related circuitry 504 are matched. Phase interpolator (PI2) located within RCK strobe related circuitry 504 may be used to align the clock with the incoming RCK with the help of the phase detector and phase aligner. A glitch free clock multiplexer located within RCK strobe related circuitry 504 may dynamically switch the clock between RCK and PI2 output based on RCK burst. A CK2RCK_SW signal may be generated by digital logic based on the RCK burst. It should be noted that no training is needed for the CK2RCK_SW signal. The RCK clock tree may always continue running at a full rate even though there is no RCK burst. RCK_CDR_input_sel is a programmable option to change an input to the clock and data recovery (CDR) so that any VT drift of the RCK tree is always tracked in burst or RCK disable modes. When there is no active RCK burst this approach ensures the system always runs at the full rate.

Figure 6:
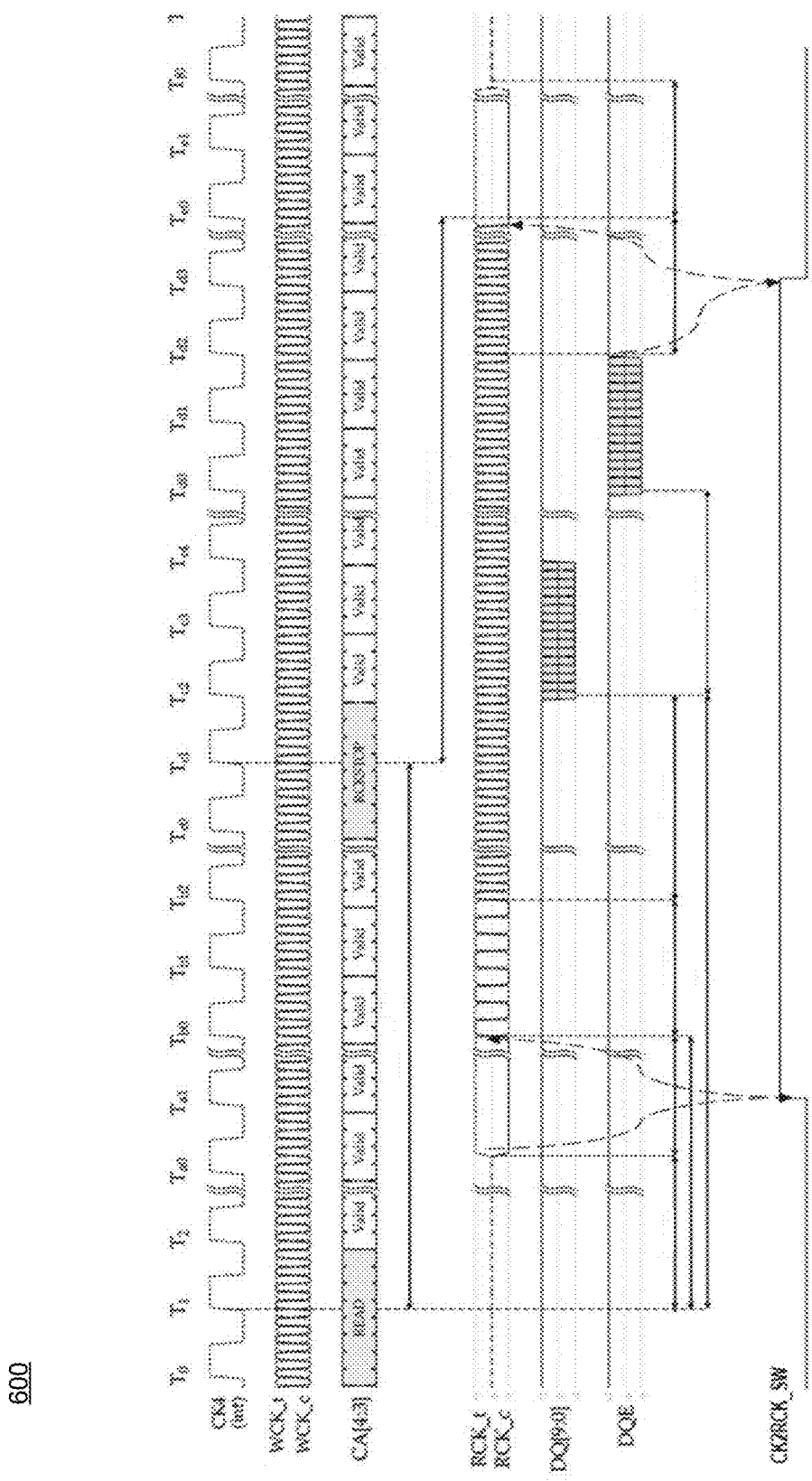
FIG. 6 is a timing diagram of a read operation with burst RCK in GDDR7 consistent with embodiments of the present disclosure.

Referring now to FIG. 6, a timing diagram 600 of a read operation with burst RCK in GDDR7 consistent with embodiments of the present disclosure is provided. In this example, CK2RCK_SW may be generated as per the RCK burst shown. The assertion is done when RCK is at static low and de-assertion is done before the RCK is stopped but after the last read data including DQE is received. As tRCKEN and RCKSTOP_LAT are set by the controller PHY logic, the assertion and desertion may be timed without doing any separate trainings.

In some embodiments, the phase interpolator (PI2) may be configured to align its output clock of same frequency as RCK with incoming RCK with the help of the phase detector and phase aligner. Phase aligner may run in the background when the RCK burst is available so that RCK to phase interpolator (PI2) output offset does not build up high values. A CK2RCK_SW signal may be generated by digital logic based on RCK burst as shown in the timing diagram as shown in FIG. 6. A glitch free clock multiplexer may dynamically switch its output between RCK and the phase interpolator (PI2) output based on this CK2RCK_SW signal. No separate training is needed for CK2RCK_SW signal with respect to the incoming data. Since the phase interpolator (PI2) output is synchronous to RCK, switching back and forth may not have any effect on the FIFO pointers and all the clock dividers in the read datapath, maintaining synchronicity with the memory controller clock. Accordingly, no re-training of the read path is needed in the RCK burst mode. Since all the phase interpolators and the CML clock tree are always at a stable state the burst-to-burst turnaround time is not limited by their settling times. In other RCK modes CK2RCK_SW may be set to one level depending on the mode. In an "RCK disable mode" CK2RCK_SW=0 may send the phase interpolator (PI2) output as a read clock to the samplers. In an "RCK always on" mode CK2RCK_SW=1 may send the RCK as a read clock to the samplers. RCK_CDR_input sel is a programmable option to change the input to the clock and data recovery (CDR) so that the RCK tree VT drift is always tracked in burst and disable RCK modes. In an "always on RCK mode" selecting the RCK receiver output as the CDR input will track the VT drift of the whole clock path including clock multiplexer.

In some embodiments, during initialization RCK is started. The CK2RCK_SW signal may be asserted. It may propagate from the phase interpolator (PI2) domain to the RCK domain asynchronously for clock muxing. The RCK strobe may then be sent through the RCK clocktree to all of the Rx phase interpolators. It may then be allowed to settle. It should be noted that any glitch due to asynchronous muxing of the clock may not create any problem as all of the timing relations may be established after this step. Once the stable RCK passes through the read clock path, the read/write pointers of the FIFO between the RCK clock and digital domain may be synchronized. The next step is to enable the clock and data recovery in the RCK and dataslices and the phase interpolator (PI2) phase aligner in the RCK slice. They may run in parallel for faster locking. Until the CDRs and the phase aligner lock the RCK may be allowed to run continuously. After the CDR and the phase aligner in the RCK are locked, the clock multiplexer is ready for synchronously switching back and forth based on RCK burst controlled by CK2RCK_SW signal. And the clock multiplexer may produce a continuous clock even if the RCK is a burst by selecting the synchronous PI2 output. The CML clock tree, phase interpolator (PI1) and the downstream circuits shown in FIG. 5 may always toggle at the full rate clock only.

In some embodiments, in burst RCK mode, the CK2RCK_SW signal may be asserted in the phase where RCK_t/c pad is at stable '0' (as shown in FIG. 6). Internally, the signal may be delayed such that, when the full rate RCK arrives, the clock may be switched from the phase interpolator (PI2) output to RCK. During the preamble edges, settling to incoming RCK strobe may occur. The read data may then be received using the RCK strobe. The RCK may be stopped using the RCKSTOP command. The de-assertion of the CK2RCK_SW signal may be timed based on the RCKSTOP latency such that, last read data in all data lines are received with RCK edges and it is to be ensured that clock multiplexer is switched to the phase interpolator (PI2) output before the last edge of RCK reaches the multiplexer. When in the "always on RCK" mode the CK2RCK_SW signal may be asserted in the beginning, and it may remain high throughout. Since RCK is continuously running the timing relation is always maintained. In contrast, in RCK disable mode the CK2RCK_SW signal may remain logic '0' and the phase interpolator (PI2) output may always be driving the read clock path maintaining the timing relations of the read path. Since the RCK and data may be launched from the DRAM with the same WCK edges, they may be matched with the input of the receivers in the PHY. The RCK strobe may then be distributed through a CML clock tree, and phase interpolator to the samplers. This additional path delay of the sampling clock may cause some jitter accumulations with respect to the read data at the sampler inputs. The read clock path to data samplers may be replicated in RCK to its samplers so that any drift in the clock path may be sensed by the RCK clock and data recovery and all clock and data recovery in the dataslices and RCK slice may be adjusted to track VT drift in the clock path. For continuous VT drift of the clock tree in all modes, a programmable option "RCK_CDR_input_sel" may be used. In such a continuous mode it may be set to 0 to select IQ samplers with an Rx output as the data input and a phase interpolator (PI1) as the clock. Since RCK is always there continuous VT drift tracking will also be there. For the burst RCK mode, "RCK_CDR_input_sel" may be set to 1 so that IQ samplers select the clock multiplexer output as the data input. Since the clock multiplexer output always toggles at a full rate, a continuous VT drift tracking of the clock tree is possible even though RCK is absent. This is also true for the RCK disable mode.

Figure 5:
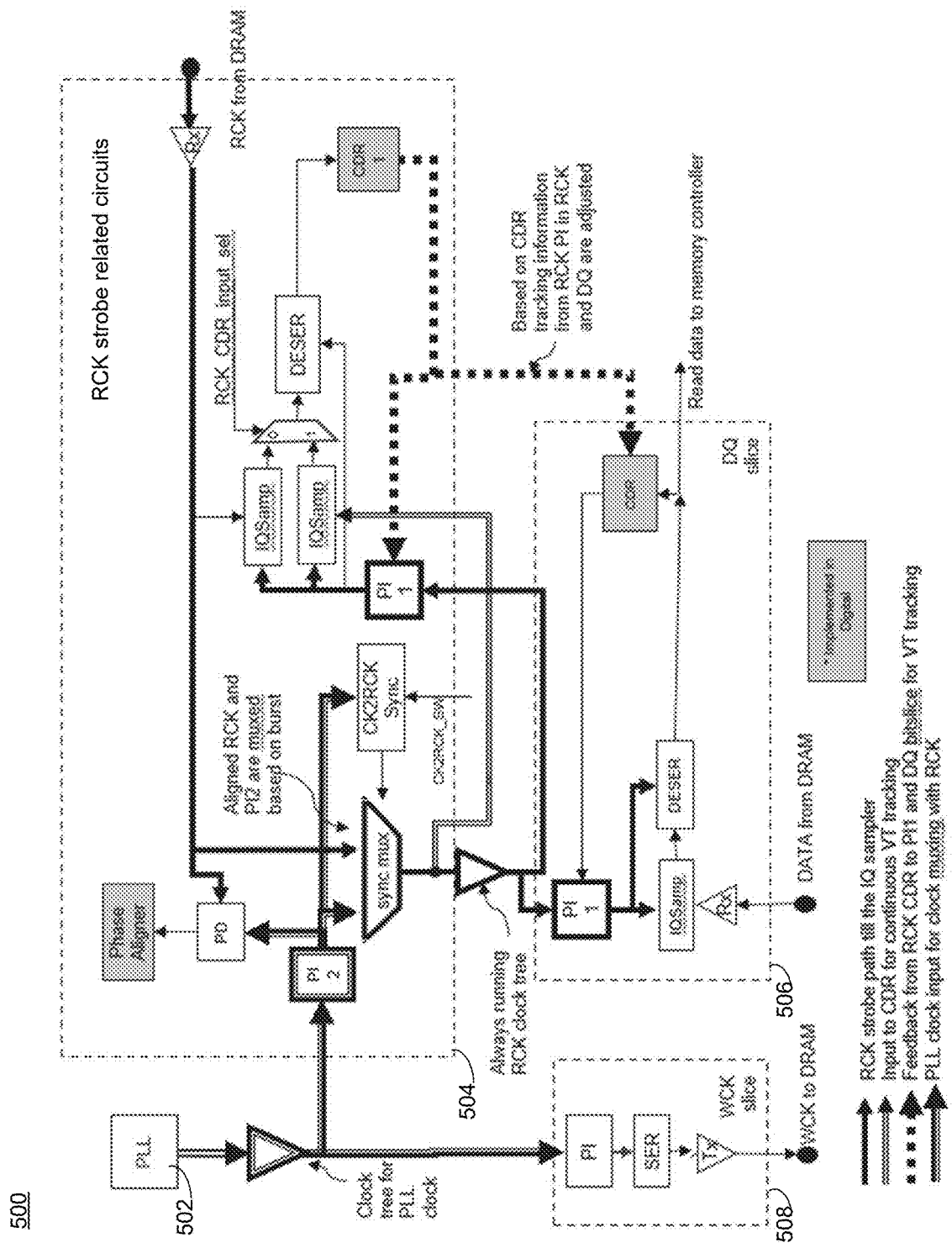
FIG. 5 is a block diagram of RCK strobe-based read path clocking consistent with embodiments of the present disclosure.
Figure 7:
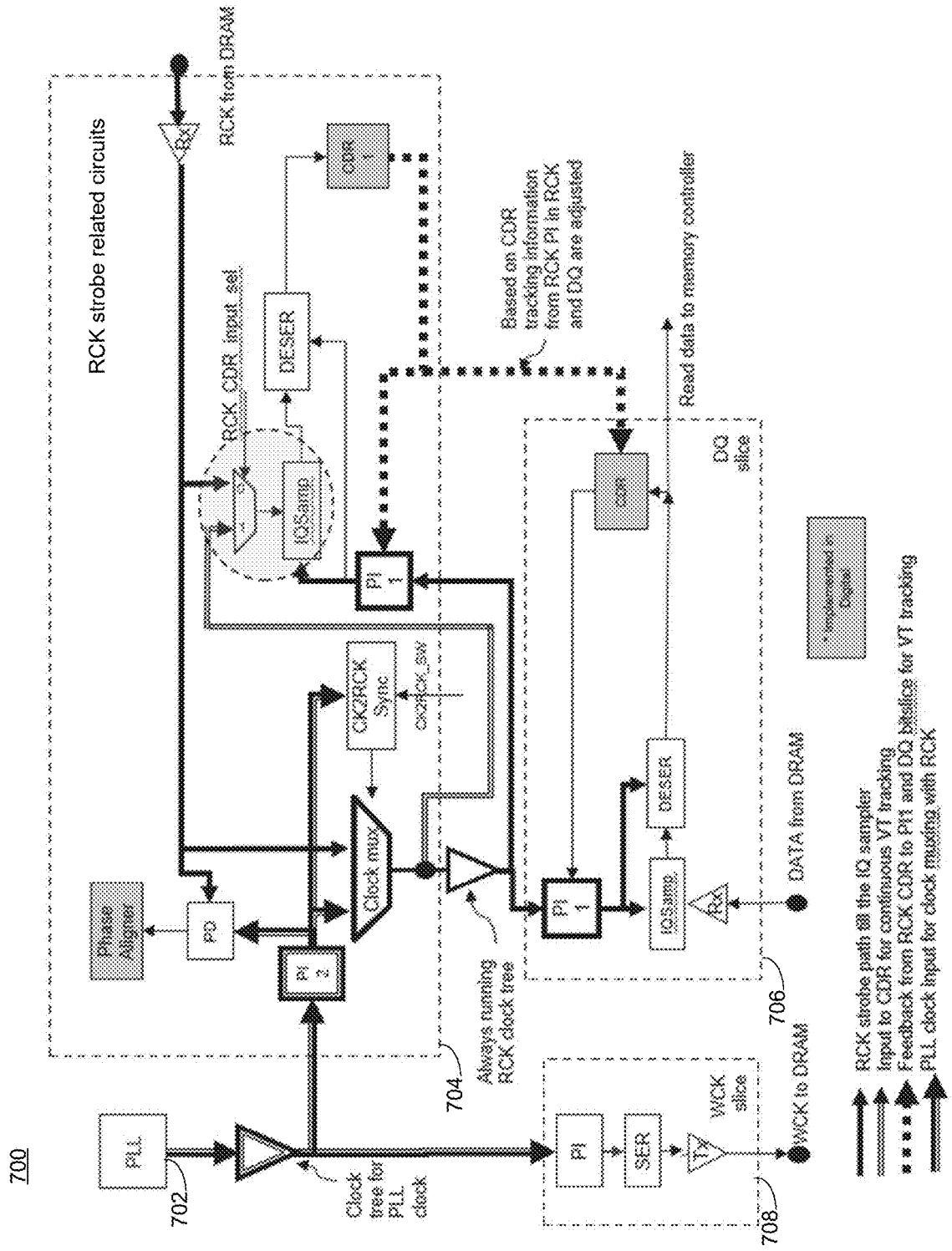
FIG. 7 is a block diagram of an alternative configuration consistent with embodiments of the present disclosure.

Referring now to FIG. 7, a block diagram 700 of an alternative configuration consistent with embodiments of the present disclosure is provided. Diagram 700 includes PLL circuitry 702, RCK strobe related circuitry 704, DQ slice circuitry 706, and WCK slice circuitry 708. In the embodiment of FIG. 5, there are two sets of IQ samplers used in the RCK block. The output of one set of the IQ samplers may be taken to the CDR circuitry for tracking based on the RCK_CDR_input_sel mode selected. In this alternate implementation the selection multiplexer may be moved to the input of the IQ sampler so that with one set of IQ samplers the same functionality may be achieved. Based on the RCK_CDR_input_sel mode selected the input to IQ sampler may be chosen.

Figure 8:
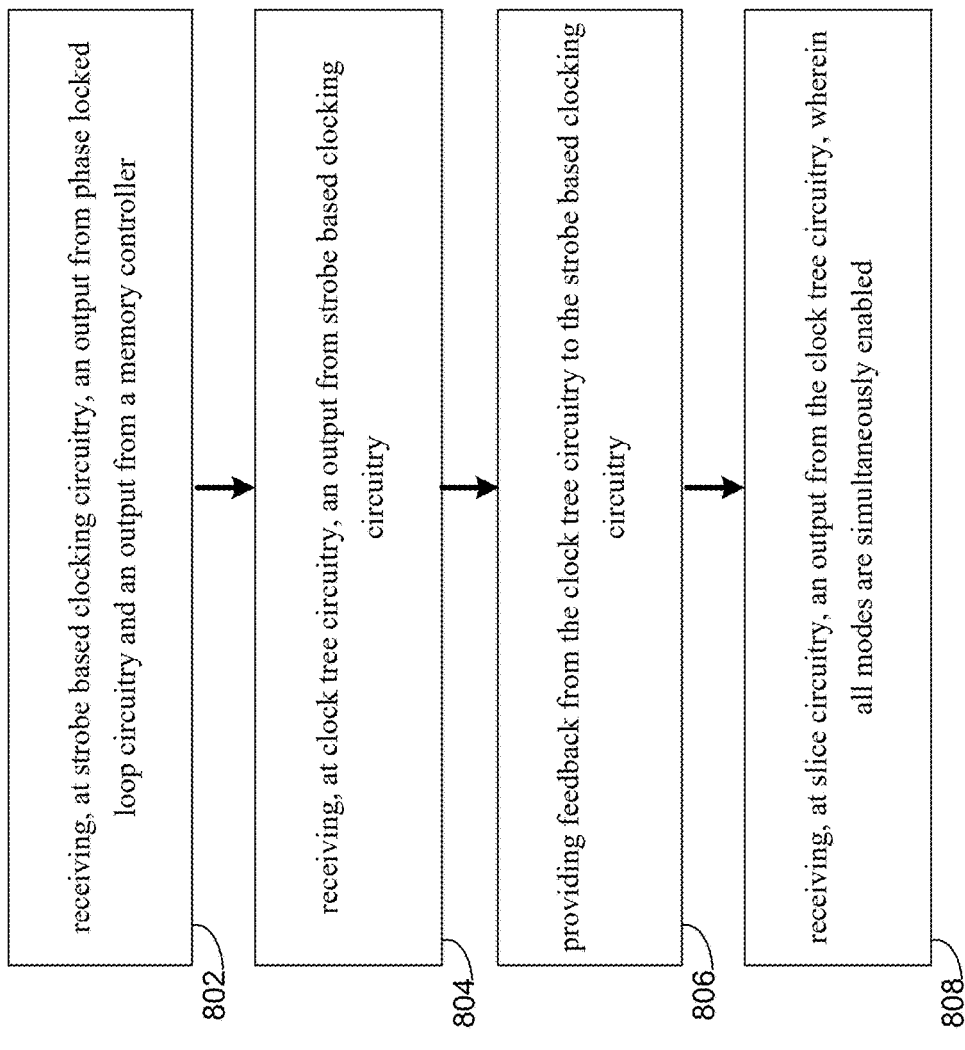
FIG. 8 is a flowchart depicting exemplary operations consistent with embodiments of the present disclosure.

Referring now to FIG. 8, a flowchart depicting exemplary operations consistent with a burst strobe read path clocking method is provided. The method may include receiving (802), at strobe-based clocking circuitry, an output from phase locked loop circuitry and an output from a memory controller. The method may further include receiving (804), at clock tree circuitry, an output from strobe-based clocking circuitry and providing (806) feedback from the clock tree circuitry to the strobe-based clocking circuitry. The method may also include receiving (808), at slice circuitry, an output from the clock tree circuitry, wherein a plurality of modes of operation are simultaneously enabled. Numerous other operations are also within the scope of the present disclosure.

Embodiments of the present disclosure provide numerous advantages over existing approaches. For example, all RCK modes are supported, even though RCK is distributed to data bitslices through a CML clock tree, AC coupled level shifter and injection locked loop (ILL)-based phase interpolators required for high-speed operations. As fast clock switching is performed to keep the clock distribution circuits at their quiescent operating point, no additional settling time or training is needed when a burst of RCK appears. The timing relations in the read data path through the memory controller is always maintained as the read path always gets a full rate clock. Any VT drift in DRAM does not appear at the read interface as the RCK may be used to sample the read data. However, it appears at phase aligner inputs. The phase aligner may tolerate much larger drift. As such, the drift of the clock tree inside DRAM may not cause the misalignment of CDR anymore. Though VT drift in the RCK clock path through the data samplers may cause misalignment of the clock and data recovery, the scheme of continuous VT tracking in all RCK modes does not allow misalignment to grow even in a non RCK period. The accumulated jitter may be greatly reduced due to RCK strobe-based clocking. This approach enables RCK strobe-based clocking for all modes associated with GDDR7 and other high-speed operations.

Embodiments of the present disclosure may enable support for all RCK modes, including burst mode. The RCK strobe may be used as a read path clock, which may be distributed through the CML clock tree, AC coupled CML2 CMOS level shifter and phase interpolators are there without any additional settling time requirement. The clock paths may settle very quickly when an RCK burst appears. Clock tree drift is always tracked even if RCK is stopped for a long time, which helps to address the issue of clock to data VT drift at samplers for the read data. Accumulated jitter may be reduced greatly due to reduced accumulation window. The BER may improve due to continuous VT tracking and less jitter accumulations.

Embodiments of the present disclosure may be used in any suitable application (e.g., GDDR7) or other high-speed applications where CML clock tree, phase interpolators and or ac-coupled stages are used in the read clock distributions path.

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A burst strobe read path clocking circuit comprising:
   strobe-based clocking circuitry configured to receive an output from phase locked loop circuitry and an output from a memory controller;
   clock tree circuitry configured to receive an output from the strobe-based clocking circuitry and provide feedback to the strobe-based clocking circuitry;
   first slice circuitry configured to receive an output from the clock tree circuitry, wherein a plurality of modes of operation are simultaneously enabled; and
   a glitch free clock multiplexer configured to dynamically switch its output based upon, at least in part, a digital logic signal.

2. The burst strobe read path clocking circuit of claim 1, wherein the burst strobe read path clocking circuit is configured to operate with a Graphics Double Data Rate 7 Synchronous Dynamic Random-Access Memory GDDR7 standard.

3. The burst strobe read path clocking circuit of claim 1, wherein all RCK modes are simultaneously enabled using an RCK strobe as a read path clock.

4. The burst strobe read path clocking circuit of claim 1, further comprising:
   a first and second phase interpolator included within the strobe-based clocking circuitry.

5. The burst strobe read path clocking circuit of claim 4, wherein the first phase interpolator receives the feedback from the strobe-based clocking circuitry.

6. The burst strobe read path clocking circuit of claim 1, wherein the second phase interpolator is configured to align an output clock signal with an incoming RCK signal using a phase detector and a phase aligner.

7. The burst strobe read path clocking circuit of claim 1, wherein during a burst mode no re-training of the read path occurs.

8. The burst strobe read path clocking circuit of claim 1, wherein the clock tree circuitry is configured to run at a full rate if a burst occurs.

9. The burst strobe read path clocking circuit of claim 1, further comprising:
   second slice circuitry configured to receive the output from the phase locked loop circuitry.

10. A burst strobe read path clocking method comprising:
    receiving, at strobe-based clocking circuitry, an output from phase locked loop circuitry and an output from a memory controller;
    receiving, at clock tree circuitry, an output from the strobe-based clocking circuitry;
    providing feedback from the clock tree circuitry to the strobe-based clocking circuitry;
    receiving, at slice circuitry, an output from the clock tree circuitry, wherein a plurality of modes are simultaneously enabled; and
    dynamically switching an output of a glitch free clock multiplexer based upon, at least in part, a digital logic signal.

11. The burst strobe read path clocking method of claim 10, wherein the burst strobe read path clocking circuit is configured to operate with a Graphics Double Data Rate 7 Synchronous Dynamic Random-Access Memory GDDR7 standard.

12. The burst strobe read path clocking method of claim 10, wherein all RCK modes are simultaneously enabled using an RCK strobe as a read path clock.

13. The burst strobe read path clocking method of claim 10, further comprising:
   providing a first and second phase interpolator within the strobe-based clocking circuitry.

14. The burst strobe read path clocking method of claim 10, wherein the first phase interpolator receives the feedback from the strobe-based clocking circuitry.

15. The burst strobe read path clocking method of claim 10, wherein the second phase interpolator is configured to align an output clock signal with an incoming RCK signal using a phase detector and a phase aligner.

16. The burst strobe read path clocking method of claim 10, wherein during a burst mode no re-training of the read path occurs.

17. The burst strobe read path clocking method of claim 10, wherein the clock tree circuitry is configured to run at a full rate if a burst occurs.

18. The burst strobe read path clocking method of claim 10, further comprising:
   receiving the output from the phase locked loop circuitry at WCK slice circuitry.

* * * * *